United States Patent [19]

Lambert

[11] Patent Number: 4,662,782
[45] Date of Patent: May 5, 1987

[54] CULVERT BEAVER BLOCK

[76] Inventor: Walter Lambert, R.R. #5, Killaloe, Ontario, Canada, K0J 2A0

[21] Appl. No.: 780,032

[22] Filed: Sep. 25, 1985

[30] Foreign Application Priority Data

Oct. 23, 1984 [CA] Canada .................................. 466066

[51] Int. Cl.$^4$ .............................................. E02B 3/00
[52] U.S. Cl. .................................. 405/108; 405/127; 405/124; 405/80
[58] Field of Search ................. 405/127, 124, 125, 80, 405/81, 83, 108, 39, 40

[56] References Cited

U.S. PATENT DOCUMENTS

| | | | |
|---|---|---|---|
| 567,653 | 9/1896 | Parker | 405/125 |
| 884,072 | 4/1908 | Carey | 405/125 |
| 997,383 | 7/1911 | Foster | 405/124 |
| 1,052,338 | 2/1913 | Holmes | 405/108 |
| 1,077,132 | 10/1913 | Erickson | 405/40 |
| 1,344,656 | 6/1920 | Saltsman | 405/39 |
| 1,664,503 | 4/1928 | Cornell | 405/125 |
| 2,361,231 | 10/1927 | Nebolsine | 405/127 X |
| 2,821,842 | 2/1958 | Christiansen | 405/108 X |

FOREIGN PATENT DOCUMENTS 135642 9/1911 Canada .
624827 8/1961 Canada .

Primary Examiner—Cornelius J. Husar
Assistant Examiner—Todd G. Williams
Attorney, Agent, or Firm—Martin P. Hoffman; Mitchell B. Wasson; Charles W. Fallow

[57] ABSTRACT

In a situation where animals, such as beavers, attempt to flood lands by blocking culverts or constructing dams across waterways, a device is used to maintain a constant flow of water through the dam or culvert. An elongated pipe or culvert with a downwardly directed opening distant from the culvert or dam is used. On the end of the pipe closest to the culvert is a gate which prevents animals and debris from passing through but allows for the smaller elongated pipe to communicate with the culvert. The beaver instinctively attempts to dam the gate area rather than dam the underwater opening of the elongated pipe, and thus is unsuccessful in stopping the flow of water.

12 Claims, 4 Drawing Figures

U.S. Patent  May 5, 1987  4,662,782
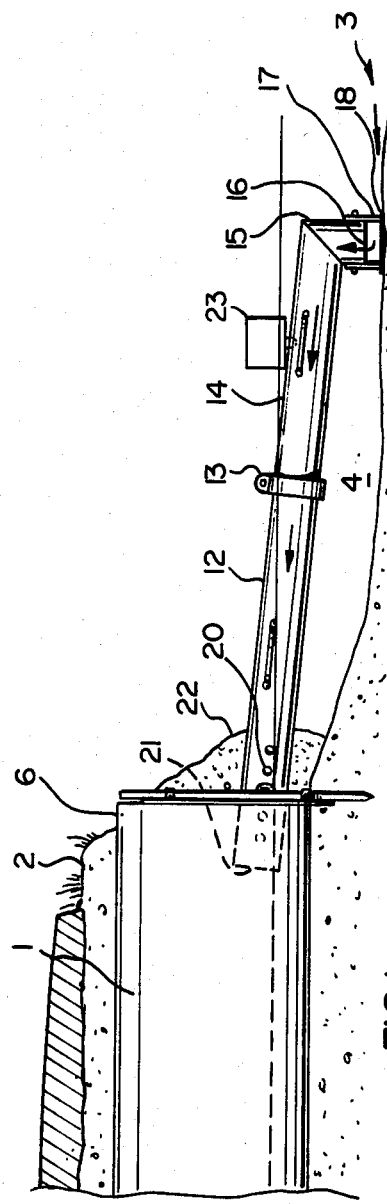
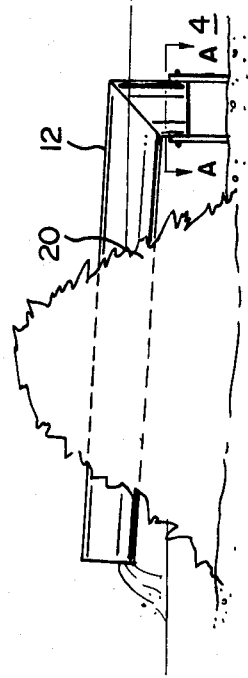
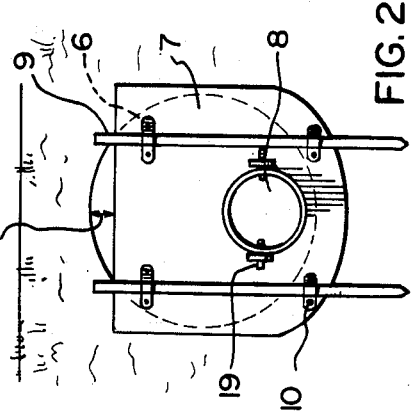

CULVERT BEAVER BLOCK

BACKGROUND OF THE INVENTION

1. Field of the Invention

This invention relates to a device for preventing blockage of streams and culverts by beavers. It has long been known that ecologically beavers as dam builders have been effective in maintaining water supplies and creating vegetation changes. However, in more civilized lands and forests and along road-ways, beavers create problems of flooding by artificially raising the levels of waterways. A particular problem occurs when beavers block road culverts, raising the level of the water adjacent to highways and flooding the same.

2. Description of the Prior Art

Various means have been used to stop the animals, such as dynamiting or transporting the animals to other wilderness areas or placing barriers or grates in front of the culverts. The use of a grate across the front of a culvert does not eliminate the problem of flooding, but makes maintenance easier, since the beaver does not have the opportunity to block the interior of the culvert. However, the grate type of block known in the art must be constantly maintained and debris removed as beavers will continue to reconstruct the dams or dykes, after man has removed them.

SUMMARY OF THE INVENTION

The present invention seeks to eliminate the problem of maintenance and to discourage the beavers to such an extent that they leave an area completely. The device according to the present invention employs the natural phenomena known by naturalists and trappers that a beaver is unable to find and block an underwater opening made by an otter. The beaver is only able to block an area where it hears flowing water. Therefore, if an inlet means is underwater, the beaver does not realize that the underwater opening is where the water is passing through. By placing an elongated pipe with a completely submerged opening distant from the culvert or dam the beaver attempts to block the main culvert or dam near its upstream portion but without success. After several days of work attempting to block the flow, the water continues to pass and the level of water remains low on the upstream side. The beaver then leaves the area as it is not suitable for its living habitat.

Therefore, this invention provides a method of preventing beavers from creating high water levels on the upstream side of a drainage channel comprising: (1) installing an elongate hollow water conduit with a downstream opening located within said drainage channel and at least one upstream opening being located upstream and distant from said drainage channel; said upstream opening being totally submerged at all times, and positioned such that said opening is below the bottom of an upstream opening of said drainage channel; (2) blocking the upstream opening of said drainage channel such that debris cannot enter but water can flow into the drainage channel through the conduit.

The invention also provides a device to prevent beavers from blocking the upstream side of a drainage channel comprising: a sturdy elongate hollow water conduit including an upstream opening for location below the surface of an upstream body of water and a downstream opening for location within said drainage channel; a blockage means for installation across the upstream side of said drainage channel comprising an opening sufficiently large to allow the downstream opening of said conduit to pass therethrough; and a means of attachment to engage the conduit within said opening; such that when in operation said blockage means prevents debris from passing into said drainage channel while said conduit provides a passage for an uninterrupted flow of water.

In another embodiment of the invention a gate is used in conjunction with a small culvert at its downstream end, the small culvert passing through the gate and communicating with the larger culvert.

In a preferred embodiment of the invention, the upstream side of the water communications means is supported on a stand with a base and employs a screen to prevent the water carrying communication means from becoming plugged by debris. The invention is more fully described in conjunction with the accompanying drawings wherein:

BRIEF DESCRIPTION OF THE DRAWINGS

FIG. 1 is a side view of the device used in conjunction with a large road culvert;

FIG. 2 is a front end view of the large road culvert; and

FIG. 3 illustrates the use of the device with a natural beaver dam and

FIG. 4 is a cross-section of the line A—A found in FIG. 3.

DESCRIPTION OF THE PREFERRED EMBODIMENTS

In FIG. 1 there appears a large culvert 1 approximately four feet in diameter located under a roadway 2. The direction of the water 3 in the drawing is shown by arrows. On the upstream side of the culvert 1 is located a body of water 4 which the beaver uses as its living habitat. On the upstream side of the large culvert 6 is placed a gate 7 having an opening 8 in the lower central portion. It is also understood that several openings could be used in cases where a large amount of water flow is necessary.

In order to hold the gate securely against the opening of a road culvert, metal posts 9 are used. The posts 9 are securely imbedded into the ground below the bottom of the culvert. The gate is fastened to the posts by means of bolts and clamps 10. A small space 11, which is generally four to six inches, is found between the top of the gate and the inside of the upper most portion of the road culvert. Through the opening 8 of the gate is passed a pipe 12. It is not necessary that the pipe 12 be a conventional culvert. It is most important that the pipe 12 fit tightly and securely through the hole 8 such that neither animals nor other objects can pass between the pipe 12 and the outermost portions of the opening 8. The pipe 12 can be made of heavy gauge galvanized steel. In the present example of preventing blockage of a four foot road culvert, a sixteen inch diameter pipe 12 approximately ten feet long may be used. If required, an extension pipe 14 can be joined to the pipe 12 by clamping means 13. An elbow 15 is joined to the end of the elongate pipe such that the opening 16 is below the surface of the water.

The elbow and the elongated pipe are raised from the bottom of the upstream body of water 4 by means of legs 17 placed on a foot pad 18. The pipe 12 is securely fastened through the gate 7 by means of large bolts 19. Varying sets of holes 20 are bored along the side near the downstream end of the smaller culvert 12 in order that the culvert may be connected through the gate at different angles. This may be necessary if the upstream bed meets the culvert at an oblique angle.

In FIG. 3, another embodiment of the invention is shown. An existing beaver dam 20 is pierced with the pipe 12 so that the water is allowed to flow out of the upstream pond 4.

In operation, once the smaller culvert has been put in place, and the water level lowers the beavers attempt to dam the culvert and again raise the water level of the upstream body of water 4. The beavers will hear no sound of water at the inlet 16 but rather will hear the water near the outlet 21 as it flows into the large culvert 1. The beaver will attempt to dam the area where the sound of the running water is, 22. No matter how high or large the dam becomes in the area 22, the water level will not increase as the water continues to flow in an unrestricted manner from the upstream portion 4 of the smaller pipes 14 and 12. The only possible way that the beavers can raise the pond is to increase the dam such that it covers the entire pipe. In repeated experiments it has been found that this will never occur as the beavers generally give up after building a dam which normally would be sufficient to hold back a given size of upstream pond. The apparatus may be maintained in the same location until the following spring, when it is necessary to remove it from its position temporarily while the spring flooding condition occurs. The apparatus is not used in the spring of the year as the beavers do not create dykes or attempt to block culverts in a flooding situation.

It is to be understood that this invention is not restricted to the examples in the preceding paragraphs but rather numerous modifications and combinations can be employed without departing from the spirit of the invention. For example in the case where a roadway runs parallel to a stream, and a road culvert by necessity is placed perpendicular to the roadway to allow the drainage of the stream from one side of the roadway to the other, it may be necessary to place a 90° elbow in the pipe 12 such that the upstream opening of said pipe is located in the middle of the upstream bed, while remaining distant from the upstream opening of the road culvert. In another embodiment, in areas of bog or deep water upstream channels, a buoy (23) may be used to keep the upstream conduit off the bottom, at a predetermined distance.

What I claim as my invention is:

1. A method of preventing beavers from creating high water levels on the upstream side of a drainage channel such as a culvert due to their construction of dams comprising:

installing an elongate hollow water conduit with a downstream opening located within said drainage channel and at least one upstream opening being located upstream and distant from said drainage channel; said upstream opening being totally submerged at all times, and positioned such that the uppermost portion of said upstream opening is below the lowermost portion of said downstream opening of said elongate hollow water conduit, such that there is no sound of water entering said upstream opening of said hollow water conduit;

blocking the upstream opening of said drainage channel such that debris cannot enter but water can flow into the drainage channel through said conduit.

2. A method of preventing beavers from creating high water levels on the upstream side of beaver dams comprising:

making an opening within said beaver dam below the surface of an upstream body of water which is substantially higher than the level on the downstream side due to the presence of said beaver dam;

installing a hollow water carrying conduit through said opening such that a downstream opening of said conduit is located on the downstream side of said beaver dam and an upstream opening is located on the upstream side of said beaver dam and distant therefrom; said upstream opening being totally submerged at all times in said upstream body of water, and positioned such that the uppermost portion of said upstream opening is below the lowermost portion of said downstream opening, such that water flows through said coduit from the upstream side of the beaver dam to the downstream side of said beaver dam, until and unless the water in said conduit is lower than the lowermost portion of the downstream opening.

3. A device to prevent beavers from creating high water levels by blocking the upstream side of a drainage channel such as a culvert comprising:

a sturdy elongate hollow water conduit including an upstream opening for location below the surface of an upstream body of water and a downstream opening for location within said drainage channel, whereby when in operation the uppermost portion of said upstream opening is located lower than the lowermost portion of said downstream opening;

a blockage means for installation across the upstream side of said drainage channel comprising an opening sufficiently large to receive the downstream portion of said conduit;

and a means of attachment to engage the conduit within said opening;

such that in operation said blockage means prevents debris from passing into said drainage channel while said conduit provides a passage for an uninterrupted flow of water, even if said beavers construct a dam or block the upstream opening of said drainage channel.

4. A device as claimed in claim 3 wherein said drainage channel is a standard road culvert and said blockage means comprises a flat plate-like structure and a plurality of rigid driving-posts, wherein said posts secure said flat plate-like structure against the upstream opening of said culvert, when in operation.

5. A device as claimed in claim 3 wherein said conduit is a cylindrical pipe of a lesser diameter than said drainage channel.

6. A device as claimed in claim 3 wherein said upstream opening of the conduit is downwardly directed when in operation.

7. A device as claimed in claim 3 wherein said upstream opening of the conduit in operation is adapted to be located above the bottom of the upstream body of water by a support means.

8. A device as claimed in claim 3 wherein said upstream opening of the conduit includes a screen to prevent debris from entering said conduit, while allowing water to pass therethrough.

9. A device as claimed in claim 3 wherein said upstream opening is almost perpendicular to the longitudinal axis of said conduit.

10. A device as claimed in claim 3 wherein said blockage means and conduit comprises a means to adjust, in the horizontal direction, the angle at which the conduit meets the blockage means.

11. A device as claimed in claim 4 wherein said flat plate-like structure is a metallic sheet with an arcuate lower edge which corresponds with the arcuate configuration of the bottom half of the opening of a road culvert; wherein, when in operation the lower portion of the upstream opening of said culvert is completely blocked with the exception of said opening which receives the downstream portion of said conduit and with the exception of a second opening between the top of said sheet and the top portion of said upstream opening of said road culvert, said second opening allowing animals and flood water to pass.

12. A device as claimed in claim 7 wherein said support means comprises a plurality of legs and a base such that when in operation the distance from the upstream opening to the base is sufficient to permit an uninterrupted entry of water.

* * * * *